US008768394B2

(12) United States Patent
Kamibeppu

(10) Patent No.: US 8,768,394 B2
(45) Date of Patent: Jul. 1, 2014

(54) RECEPTION APPARATUS AND COMMUNICATION SYSTEM

(75) Inventor: Shinichi Kamibeppu, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 456 days.

(21) Appl. No.: 13/259,114

(22) PCT Filed: Mar. 26, 2010

(86) PCT No.: PCT/JP2010/002190
§ 371 (c)(1),
(2), (4) Date: Sep. 22, 2011

(87) PCT Pub. No.: WO2010/109906
PCT Pub. Date: Sep. 30, 2010

(65) Prior Publication Data
US 2012/0021795 A1    Jan. 26, 2012

(30) Foreign Application Priority Data

Mar. 26, 2009  (JP) ................. 2009-077394

(51) Int. Cl.
*H04W 4/20* (2009.01)
*H04W 4/02* (2009.01)
*H04M 1/725* (2006.01)

(52) U.S. Cl.
CPC .............. *H04W 4/206* (2013.01); *H04W 4/021* (2013.01); *H04M 1/72575* (2013.01); *H04M 1/72566* (2013.01)
USPC .......... 455/517; 455/418; 455/419; 455/41.2; 455/415; 700/94; 370/395.3; 370/395.4

(58) Field of Classification Search
CPC ..................... H04M 1/72566; H04M 1/72572; H04W 4/021; H04W 4/206
USPC ............. 455/517, 419, 418, 466, 426.1, 41.2, 455/420, 524, 186.1, 566, 415; 725/131, 725/41, 40; 345/467, 634; 700/94; 370/385, 370/395.3, 395.4
See application file for complete search history.

(56) References Cited

U.S. PATENT DOCUMENTS 8,385,913 B2 * 2/2013 Proctor et al. ............. 455/426.1
2003/0050053 A1 * 3/2003 Wang et al. .................. 455/418
(Continued)

FOREIGN PATENT DOCUMENTS

CN          1829338 A       9/2006
JP         09-098473        4/1997
(Continued)

OTHER PUBLICATIONS

The first Office Action issued by the State Intellectual Property Office of People's Republic of China on Nov. 4, 2013, which corresponds to Chinese Patent Application No. 201080022963.1 and is related to U.S. Appl. No. 13/259,114; with English concise explanation.

(Continued)

*Primary Examiner* — Tan Trinh
(74) *Attorney, Agent, or Firm* — Studebaker & Brackett PC

(57) ABSTRACT

Provided is a reception apparatus for outputting service information in an appropriate area at a suitable time so that the service information distributed has consumer attraction and a communication system in which the reception apparatus is used. A reception apparatus 100 has a reception unit 30 configured to receive service information including a display time condition transmitted from a narrow area base station 200 and identifier information of a wide area base station 300 transmitted from the wide area base station 300, a memory unit 40 configured to store the service information and the identifier information, a display unit 50 configured to display the service information, and a control unit 10, after storing the service information received by the reception unit 30 and the identifier information of the wide area base station 300 received by the reception unit 30 in the memory unit 40 in association with each other, configured to control the display unit 50 to display service information satisfying the display time condition among the service information stored in the memory unit 40 when the reception unit 30 re-receives the identifier information of the wide area base station 300 associated with the service information.

5 Claims, 5 Drawing Sheets

(56) References Cited

U.S. PATENT DOCUMENTS

| | | | |
|---|---|---|---|
| 2003/0055817 A1* | 3/2003 | Yoshimura et al. | 707/3 |
| 2003/0060191 A1* | 3/2003 | Wang et al. | 455/419 |
| 2006/0246893 A1 | 11/2006 | Tamura | |
| 2008/0051919 A1* | 2/2008 | Sakai et al. | 700/94 |
| 2009/0138934 A1* | 5/2009 | Aoki et al. | 725/131 |
| 2010/0146547 A1* | 6/2010 | Hong et al. | 725/40 |
| 2010/0223138 A1* | 9/2010 | Dragt | 705/14.64 |
| 2010/0261491 A1* | 10/2010 | Alanara et al. | 455/466 |
| 2011/0074820 A1* | 3/2011 | Nakahara et al. | 345/634 |
| 2012/0324031 A1* | 12/2012 | Asthana et al. | 709/206 |

FOREIGN PATENT DOCUMENTS

| | | |
|---|---|---|
| JP | 2002-010349 A | 1/2002 |
| JP | 2002-245077 | 8/2002 |
| JP | 2003-143260 A | 5/2003 |
| JP | 2003-235063 A | 8/2003 |

OTHER PUBLICATIONS

International Search Report; PCT/JP2010/002190; Apr. 27, 2010.

* cited by examiner

RECEPTION APPARATUS AND COMMUNICATION SYSTEM

CROSS REFERENCE TO RELATED APPLICATION

This application claims priority to and the benefit of Japanese Patent Application No. 2009-077394 filed on Mar. 26, 2009, the entire contents of which are incorporated herein by reference.

TECHNICAL FIELD

The present invention relates to reception apparatuses and communication systems, and more specifically, to reception apparatuses for receiving service information specific to an area and communication systems including base stations for transmitting the service information to the reception apparatuses.

BACKGROUND ART

There are conventionally suggested various information distribution systems in which, when a reception apparatus, such as a mobile phone, enters a specific area within the reach of radio waves from a particular base station, the base station provides a service such as distributing service information unique to the specific area to the reception apparatus. For example, there is suggested a terminal apparatus for extracting information unique to a base station (base station ID) from identifier information transmitted from the base station in wireless communication with the mobile phone and automatically receives area information corresponding to the base station ID with an embedded information storage unit (see Patent Document 1). The terminal apparatus described in Patent Document 1 prestores information on each area in an internal medium or the like and, when it detects the base station ID transmitted from the base station in the area, provides a user with the information on the area corresponding to the base station ID.

In addition, there is also suggested a communication terminal capable of obtaining location information and obtaining area information corresponding to the location by communicating with an external source (see Patent Document 2). According to Patent Document 2, a mobile terminal such as the mobile phone, being located in a particular area, can provide a user with information suitable for the area by receiving information such as guide information from the external source. The terminal apparatus described in Patent Document 2 can specify its location to a high accuracy by a GPS (Global Positioning System) communication or by measuring a distance from a base station installed at a fixed location.

By appropriate applications of those techniques, it is possible to provide a user of a communication terminal which has entered a particular area with service information specific to the area by distributing service information unique to the area through wireless communication from an apparatus such as a base station or the like. Recently, techniques specialized for communications in a narrow area, such as gap fillers and femtocells, have been developed. Therefore, applications of the above techniques to services for a narrow area allows for a detailed service such as distribution of information unique to the area from an apparatus in the area to the terminal having entered the narrow area.

Various information may be considered as the service information used for these techniques. For example, if the area for distribution of the service information is small like a shop, the service information may be information on limited items or recommended items of the shop or information on a date of a sale or an event. Hereinafter, information distributed in a narrow area and related to a service provided to consumers in the narrow area is referred to as "service information."

PRIOR ART DOCUMENTS

Patent Documents

Patent Document 1: JP 9-98473 A
Patent Document 2: JP 2002-245077 A

SUMMARY OF INVENTION

Technical Problem

As described above, if a base station distributes service information unique to an area to a reception apparatus which has entered the narrow area such as a shop, there is an advantage that the base station can distribute information unique to the shop. It is possible to enhance consumers' purchasing interests in products of the shop by distributing information on recommended items of the shop, for example, as the service information to the consumer who came into the shop as described above.

On the other hand, the information on the date of a sale or an event of the shop is distributed as the service information as described above, usually intending to convince consumers to visit the shop. That is, this service information is required to have consumer attraction.

For example, if the shop is currently holding the sale or the like, the service information to inform accordingly may enhance the consumers' purchasing interests in the products of the shop. However, this service information is distributed only to the consumers already in the shop but not to others. Therefore, this service information hardly has the consumer attraction to make people come into the shop.

Service information on future events may attract the consumers already in the shop. That is, if information such as "the sale of the shop will be held 3 days later" is distributed to the consumers in the shop, it may motivate them to visit the shop again. Accordingly, this service information may have the consumer attraction.

Generally, however, even though receiving the information on future events, many people are likely to forget about the information before the date of the event. Normally, shops schedule operating plans to hold events such as the sale well in advance. However, if the information on the event is distributed to the consumers too far in advance, most of the consumers may not remember the information to the day of the event. In providing the service information, therefore, it is very important when the information is provided to the users (that is, presented to the users).

It may be considered to add a feature, by using a function such as timer included in the reception apparatus or the like, to display the service information not upon distribution but after a predetermined time. Such a feature enables to display the service information on the reception apparatus when approaching the day of the event, such as the sale, or on the day of the event, for example. Thereby, it may avoid a risk that the users forget about the service information.

However, even though the service information is displayed on the reception apparatus on the day of the event, it is highly unlikely that the users remote from the shop holding the event bother to go all the way to the shop. In such a case, the service information may lose the consumer attraction.

Moreover, if a user remembers the day of the event and is already in the shop holding the event, such service information on the event being displayed on the reception apparatus is nothing but an annoyance. In this case also, the service information no longer has the consumer attraction but considered as useless as junk mails and spam mails.

Accordingly, it is an object of the present invention, in consideration of such conditions, to provide reception apparatuses for outputting service information in an appropriate area at a suitable time such that the service information distributed has the consumer attraction, and communication systems in which such reception apparatuses are used.

Solution to Problem

In order to achieve the above object, a reception apparatus according to a first aspect of the present invention includes:

a reception unit configured to receive service information including a display time condition and transmitted from a narrow area base station and identifier information of a wide area base station transmitted from the wide area base station;

a memory unit configured to store the service information and the identifier information received by the reception unit;

a display unit configured to display the service information; and a control unit, after storing the service information received by the reception unit and the identifier information of the wide area base station received by the reception unit in association with each other, configured to control the display unit to display service information satisfying the display time condition among the service information stored in the memory unit when the reception unit re-receives the identifier information of the wide area base station associated with the service information.

A second aspect of the present invention is the reception apparatus according to the first aspect, wherein the control unit, when the reception unit receives the service information, stores the service information in the memory unit in association with the identifier information of the wide area base station received by the reception unit.

A third aspect of the present invention is the reception apparatus according to the first aspect, wherein the control unit, if the reception unit cannot receive the identifier information of the wide area base station when receiving the service information, stores the service information in the memory unit and, when the reception unit receives the identifier information later, stores the identifier information in association with the service information stored in the memory unit.

A fourth aspect of the present invention is the reception apparatus according to the first aspect, further comprising a history memory unit configured to store a history of identifier information of wide area base stations received by the reception unit, wherein if the reception unit cannot receive the identifier information of the wide area base station when receiving the service information, the control unit stores the service information in the memory unit in association with identifier information selected from the history of the identifier information of the wide area base stations stored in the history memory unit.

Additionally, in order to achieve the above object, a communication system according to a fifth aspect of the present invention includes:

a narrow area base station configured to transmit service information including a display time condition to a reception apparatus;

a wide area base station configured to transmit its own identifier information to the reception apparatus; and the reception apparatus, after storing the service information transmitted from the narrow area base station and the identifier information transmitted from the wide area base station in association with each other, configured to display service information satisfying the display time condition among the service information stored when re-receiving the identifier information of the wide area base station associated with the service information.

Effect of the Invention

The reception apparatus according to the present invention can associate service information transmitted from a narrow area base station with identifier information received from a wide area base station. Thereby, the reception apparatus of the present invention may display service information satisfying a display time condition among the service information on a display unit when re-receiving the identifier information of the wide area base station associated with the service information. Accordingly, the reception apparatus of the present invention, which has received the service information from the narrow area base station, can display useful service information in a timely fashion when approaching (before actually entering) the area of the service information at a later date, for example. Hence, the service information distributed by each shop can have consumer attraction.

DESCRIPTION OF EMBODIMENT

Embodiments of the present invention will be described with reference to the accompanying drawings.

Figure 1:
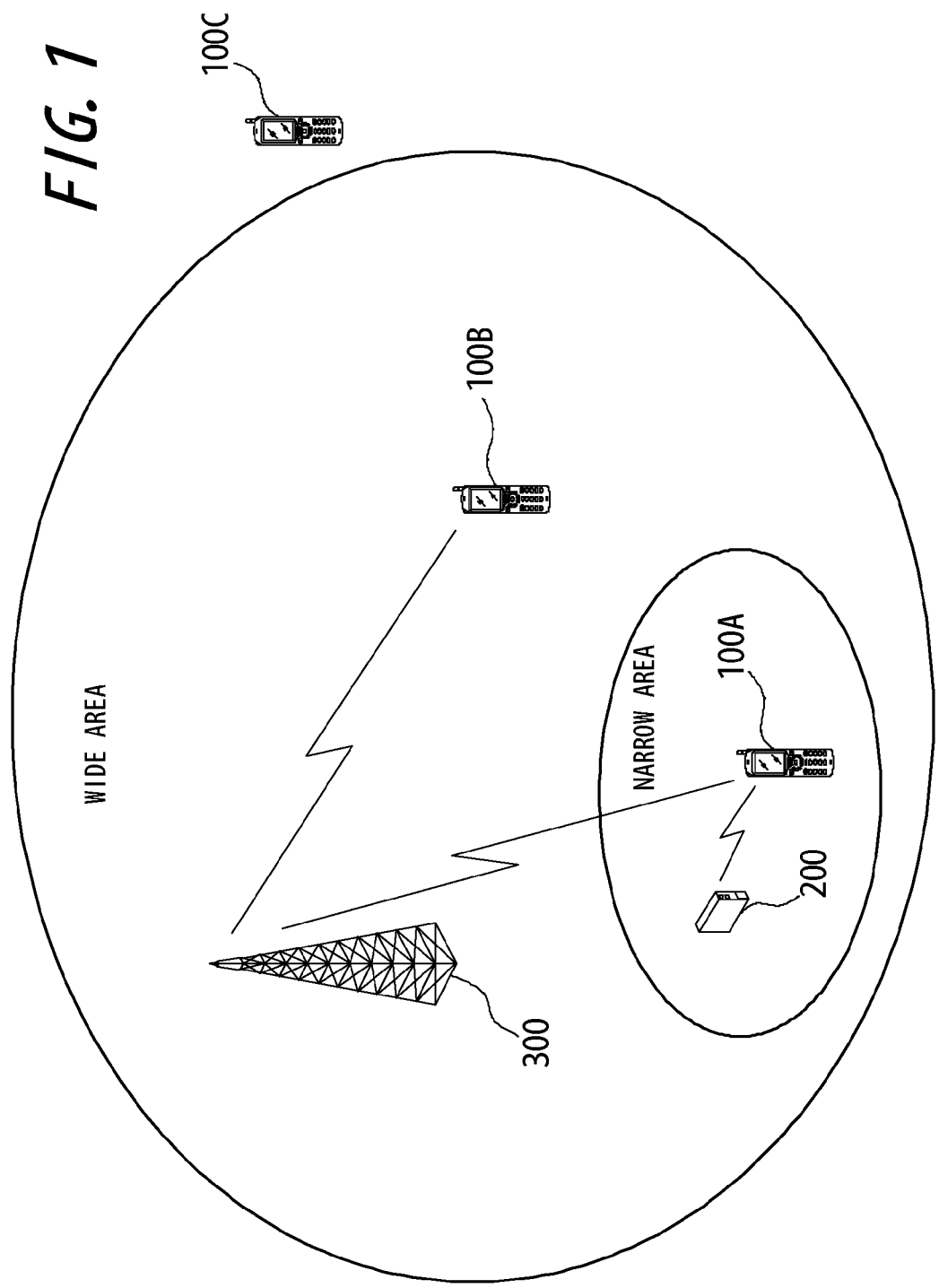
FIG. 1 is a conceptual diagram illustrating the most basic configuration of a communication system according to an embodiment of the present invention.

FIG. 1 is a conceptual diagram illustrating the most basic configuration of a communication system according to an embodiment of the present invention. As shown in FIG. 1, the communication system according to the embodiment of the present invention includes a reception apparatus 100, a narrow area base station 200 and a wide area base station 300 as the most basic configuration.

The following description of the embodiment assumes that the reception apparatus 100 is a mobile phone. However, the reception apparatus 100 according to the present invention is not limited to the mobile phone but may be applicable, for example, to any mobile terminal such as a PDA, a laptop computer and the like, or an apparatus other than the mobile terminal, such as a car navigation system terminal and the like. Reception apparatuses 100A, 100B and 100C indicate the same terminal at different locations for communication.

In addition, the following description of the embodiment assumes that the narrow area base station 200 is a femtocell base station. According to the present invention, however, the narrow area base station 200 is not limited to the femtocell base station but may be any base station for a relatively small area, such as a picocell, a nanocell, a microcell or the like, for example. For the sake of description, the area covered by the narrow area base station 200, that is, the area in which radio waves from the narrow area base station 200 can be received is referred to as a "narrow area" in the embodiment of the present invention. In FIG. 1, the reception apparatus 100A is located in the narrow area of the narrow area base station 200 and can receive radio waves from the narrow area base station 200.

In the following description, the narrow area of the narrow area base station 200 is assumed as a relatively small area such as inside of a building of a shop. By the femtocell base station installed in the building of the shop, the reception apparatus 100 can receive radio waves from both the narrow area base station 200 and the wide area base station 300 inside the building but only radio waves from the wide area base station 300 outside the building. According to the present invention, however, the narrow area of the narrow area base station 200 is not limited to the inside of a shop but may be a variety of places, such as underground malls, for example.

The narrow area base station 200 transmits service information including a display time condition to the reception apparatus 100. The "service information" is information distributed in the narrow area and related to a service provided to consumers in the narrow area as described above. Specifically, the service information may be information (advertisement or the like) to notice a sale or an event which will be held in the near future by a shop in the narrow area in which the service information is distributed. In addition, the "display time condition" is information describing a condition of a time to display the service information on the reception apparatus 100 and transmitted to the reception apparatus 100, being included in the service information. The reception apparatus 100 displays only the service information satisfying the display time condition among the service information received. Accordingly, if the service information does not specify the time to be displayed, that is, if the service information should be displayed upon distribution, the narrow area base station 200 may transmit the service information without including the display time condition therein to the reception apparatus 100. In this case, alternatively, the narrow area base station 200 may include the display time condition as "optional" in the service information and transmit it to the reception apparatus 100.

In addition, it is assumed that the wide area base station 300 is a macrocell base station in the present embodiment. According to the present invention, the wide area base station 300, as long as covering a relatively large area, is not limited to its communication scheme. In the present embodiment, the area covered by the wide area base station 300, that is, the area in which the radio waves from the wide area base station 300 can be received is referred to as a "wide area", for the sake of description. In FIG. 1, the reception apparatuses 100A, 100B are located in the wide area of the wide area base station 300 and can receive the radio waves from the wide area base station 300.

The wide area base station 300 transmits its identifier information to the reception apparatus 100. The identifier information may be a base station ID of the wide area base station 300 which allows for discrimination of the wide area base station 300 from other base stations. Since a technique for a base station apparatus to transmit its identifier information is well known in the art, a detailed description thereof is omitted.

As shown in FIG. 1, the reception apparatus 100A is located in the narrow area, as well as in the wide area. Therefore, the reception apparatus 100A can receive the radio waves from both the narrow area base station 200 and the wide area base station 300. The reception apparatus 100B is located in the wide area but outside the narrow area. Therefore, the reception apparatus 100B cannot receive the radio waves from the narrow area base station 200 but can receive the radio waves from the wide area base station 300. The reception apparatus 100C is located outside both the narrow area and the wide area. Therefore, the reception apparatus 100C cannot receive the radio waves from either the narrow area base station 200 or the wide area base station 300. The location of the reception apparatus 100C may be inside an area of another base station other than the narrow area of the narrow area base station 200 and the wide area of the wide area base station 300.

Next, the reception apparatus 100 according to the embodiment of the present invention will be further described. The narrow area base station 200 may have a configuration almost the same as a base station of a conventional femtocell or the like, whereas the wide area base station 300 may have a configuration almost the same as a base station of a conventional macrocell or the like. Hence, detailed descriptions of configurations of the narrow area base station 200 and the wide area base station 300 are omitted.

Figure 2:
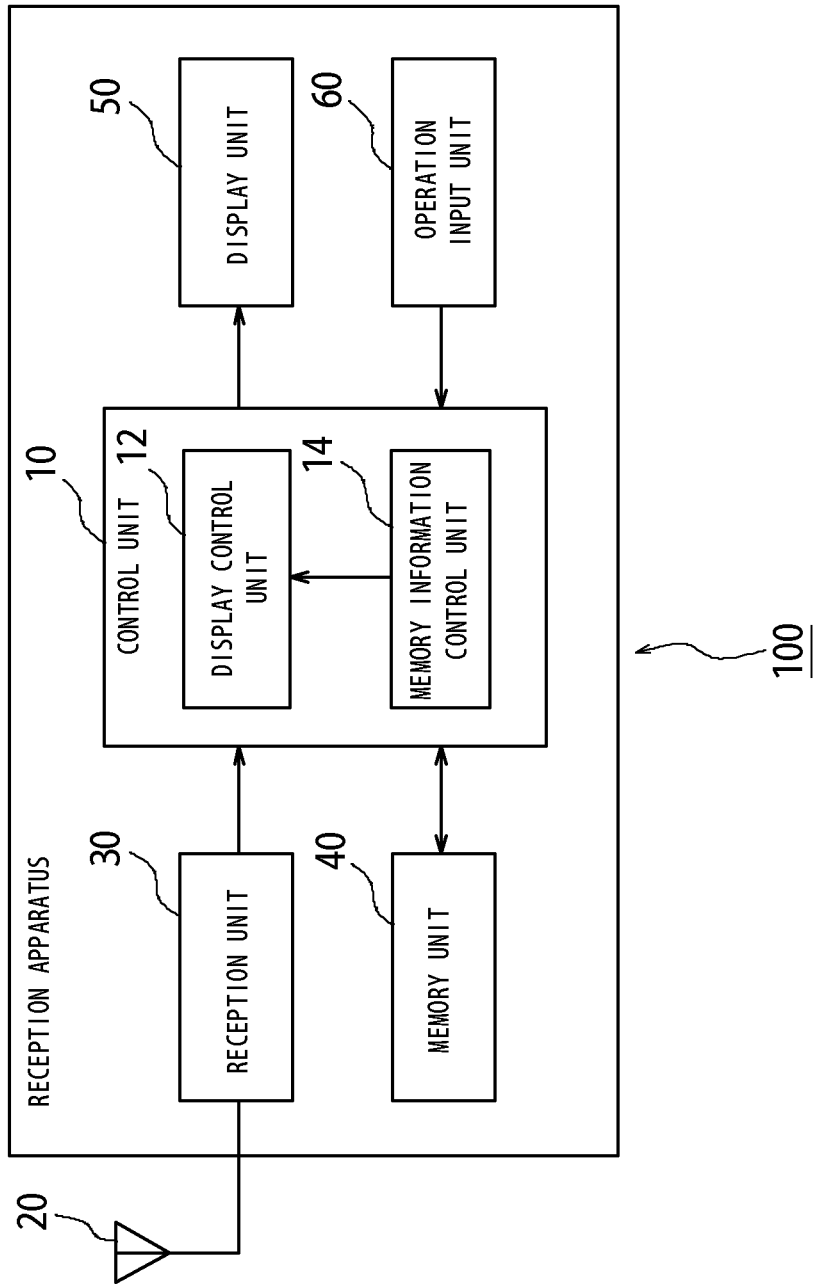
FIG. 2 is a functional block diagram illustrating a schematic configuration of a reception apparatus according to the embodiment of the present invention.

FIG. 2 is a functional block diagram illustrating a schematic configuration of the reception apparatus according to the embodiment of the present invention. As shown in FIG. 2, the reception apparatus 100 has a control unit 10, an antenna 20, a reception unit 30, a memory unit 40, a display unit 50 and an operation input unit 60.

The control unit 10 controls overall operations of the reception apparatus 100 and carries out various processing necessary for such control. The control unit 10 includes a display control unit 12 and a memory information control unit 14. The antenna 20 transmits and receives the radio waves to/from the narrow area base station 200, the wide area base station 300 and other base stations. The reception unit 30 receives the service information (including the display time condition) transmitted from the narrow area base station 200 via the antenna 20. The reception unit 30 also receives the identifier information of the wide area base station 300 transmitted from the wide area base station 300 via the antenna 20.

The memory unit 40 stores various information including the service information received from the narrow area base station 200 and the identifier information of the wide area base station 300 received from the wide area base station 300. In addition, the memory unit 40 includes a history memory unit configured to store a history of the identifier information (base station IDs) of wide area base stations in respective wide areas when the reception apparatus 100 moves across a wide area and enters another wide area. The display unit 50 displays the service information provided from the control unit 10. The operation input unit 60 includes various keys and buttons for receiving operation inputs by a user. Alternatively, the operation input unit 60 may be constituted of a touch panel including the display unit 50.

When the reception unit 30 receives the service information from the narrow area base station 200, the memory information control unit 14 included in the control unit 10 carries out processing to associate the service information with the identifier information of the wide area base station 300 that the reception unit 30 has received from the wide area base station 300. The display control unit 12 included in the control unit 10 extracts the service information stored in the memory unit 40 and controls to display it on the display unit 50. That is, the display control unit 12 controls to display the service information satisfying the display time condition among the service information on the display unit 50 when the reception unit 30 re-receives the identifier information of the wide area base station 300 associated with the service information. This processing will be described in detail below.

The following is a description of associating processing of the service information by the reception apparatus 100 according to the present embodiment. As an example to describe the processing, the narrow area of the narrow area base station 200 is inside a mass retailer. In addition, the following description assumes that a user of the reception apparatus 100 moves with carrying the reception apparatus 100 from a location of the reception apparatus 100C to a location of the reception apparatus 100B and then to a location of the reception apparatus 100A in FIG. 1. As an example of a specific case, it may be assumed that the user living near the location of the reception apparatus 100C arrives at the location of the reception apparatus 100A in the narrow area of the narrow area base station 200, which is inside a shop, moving via a vicinity of the location of the reception apparatus 100B.

Figure 3:
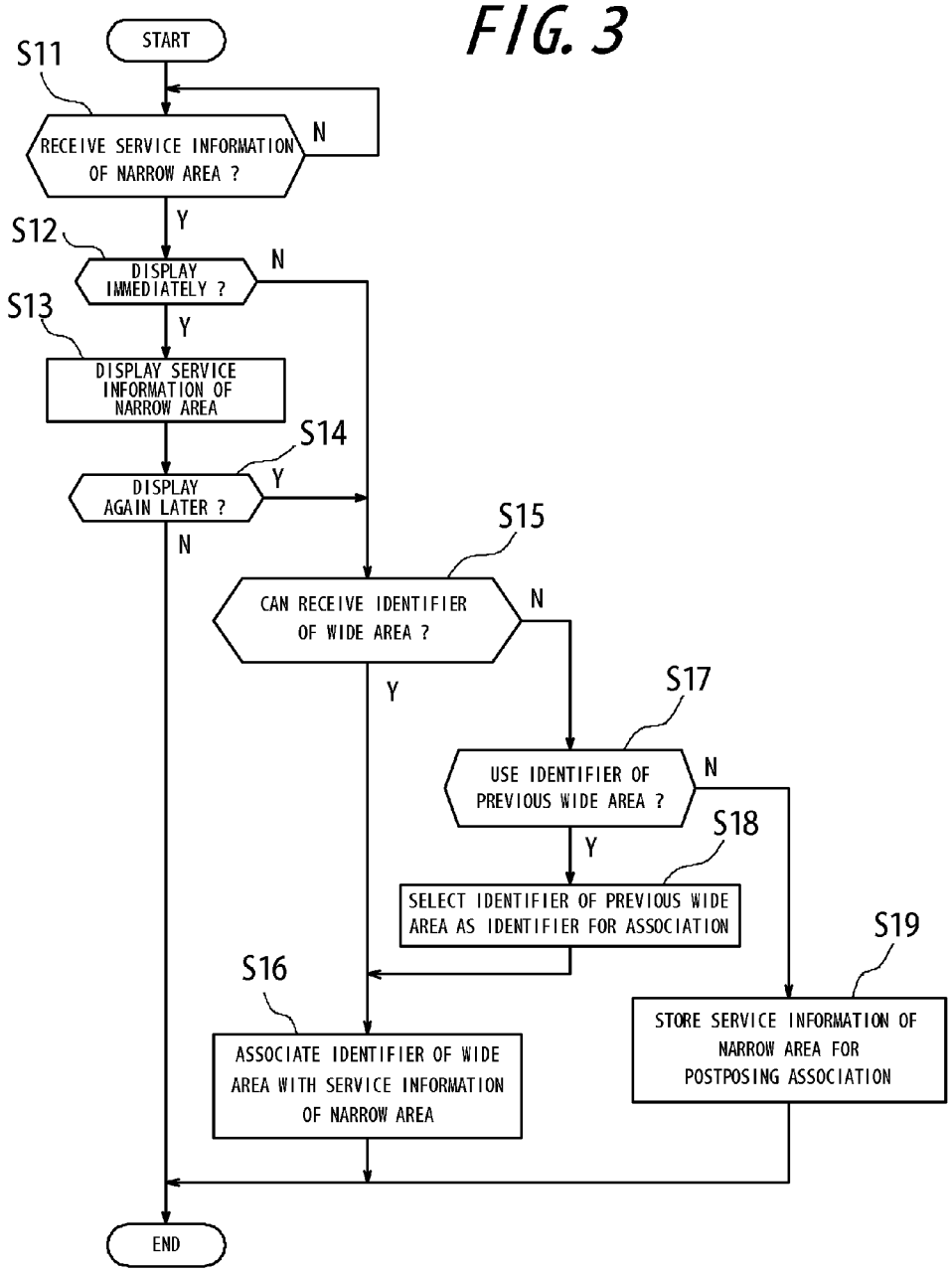
FIG. 3 is a flowchart illustrating associating processing of service information according to the embodiment of the present invention.

FIG. 3 is a flowchart illustrating the associating processing of the service information by the reception apparatus 100 according to the embodiment of the present invention.

As described above, the associating processing of the service information starts when the reception apparatus 100 arrives at the narrow area of the narrow area base station 200 inside a shop, that is, the location of the reception apparatus 100A. Upon start of the processing, the control unit 10 determines whether the reception unit 30 has received the service information transmitted from the narrow area base station 200 (step S11). If the service information has not received at step S11, the control unit 10 waits for reception of the service information. In contrast, if the reception unit 30 has received the service information at step S11, the control unit 10 determines whether the service information should be displayed on the display unit 50 immediately (step S12).

Such "information which should be displayed immediately" determined at step S12 may be, in particular, the service information of the narrow area, such as information on a time-limited offer currently available in the shop, information on products just arrived today having much point to be announced immediately, general information of the shop (for example, business hours) and the like.

The determination on whether it is the "information which should be displayed immediately" may be made based on whether a display time condition is included in the service information received at step S11, and if not included, the display control unit 12 regards the service information as information which should be displayed immediately upon reception and displays the service information on the display unit 50 (step S13). If a display time condition is included in the service information received at step S11, the display control unit 12 analyzes the display time condition, and if the display time condition is satisfied currently, displays the service information on the display unit 50 (step S13).

When the service information of the narrow area is displayed on the display unit 50 at step S13, there may be a variety of display modes based on setting of the reception apparatus 100. For example, it is possible to set the reception apparatus 100 so as to display the service information regardless of the user's intention upon reception thereof or to display a pop-up window indicating reception of the service information first when the service information is received and then display the service information based on an input to the operation input unit 60 by the user.

In contrast, if the display control unit 12, as a result of analysis on the display time condition in the service information, determines that the display time condition is not satisfied currently, the display control unit 12 does not display the service information now (No of step S12). Here, the display time condition may not be satisfied currently when, for example, the display time condition is received, being attached to the service information intended to be displayed (not now but) later, such as the information on the event of the sale held in the near future or information on schedules for arrival of products.

After displaying the service information at step S13, the display control unit 12 determines whether there is information to be displayed again later (step S14). In this case also, the display control unit 12 analyzes the display time condition included in the service information, and if there remains the service information including the display time condition to be satisfied later, shifts to processing at step S15. This is because it is expected that, if a plurality of service information is received, they may include different display time conditions. In addition, it is also expected that a display time condition to be satisfied later may be included in a part of the service information already displayed as the display time condition is satisfied. If there is no residual service information to be displayed again later at step S14, the processing ends.

The processing shifts to step S15 if it is determined, based on the display time condition, that the service information will not be displayed now at step S12, or that there is the service information to be displayed again later at step S14. The control unit 10 determines whether the reception unit 30 can receive the identifier information of the wide area base station 300 transmitted from the wide area base station 300 (step S15). For example, FIG. 1 shows a state that the reception apparatus 100A, which has received the service information of the narrow area (shop) from the narrow area base station 200, can receive the identifier (base station ID or the like) of the wide area from the wide area base station 300, as well.

As stated above, if the reception apparatus 100 can receive the identifier information of the wide area base station 300, the memory information control unit 14 receives the identifier information of the wide area base station 300 of the wide area and associates it with the service information of the narrow area base station 200 of the narrow area already received (step S16). That is, the reception apparatus 100 of the present invention associates the service information of the narrow area with the identifier information of the wide area wider than the narrow area. In addition, the memory information control unit 14 controls to store the service information and the identifier information associated with each other as above in the memory unit 40 at step S16.

In contrast, if the reception unit 30 cannot receive the identifier information of the wide area base station 300 at step S15, the processing shifts to step S17. The reception unit 30 may not be able to receive the identifier information of the wide area base station 300 when the building of the shop defining the narrow area has a highly electromagnetic wave shielding construction or locates underground in FIG. 1, for example. In addition, it is also considered that frequencies of radio waves from the wide area base station 300 are different from those of radio waves from the narrow area base station 200. In such cases, the radio waves from the wide area base station 300 of the wide area may not reach the reception apparatus 100A.

In such cases, the control unit 10 determines whether to use identifier information of a previous wide area base station of the wide area (step S17). Yes or No of the determination at step S17 may be determined in advance, or a user may be asked to determine and input Yes or No using the operation input unit 60.

If it is selected at step S17 to use the identifier information of the previous wide area base station of the wide area, the control unit 10 selects the identifier information of the previous wide area base station of the wide area as the identifier information of the wide area base station of the wide area for association (step S18). This processing is performed using the history of the identifier information (base station IDs) of the wide area base stations of the wide areas that the reception apparatus 100 has entered so far, stored in the history memory unit included in the memory unit 40. In the state shown in FIG. 1, for example, the user of the reception apparatus 100 moves with carrying the reception apparatus 100 from the location of the reception apparatus 100C to the location of the reception apparatus 100B and then to the location of the reception apparatus 100A. In this case, the history memory unit included in the memory unit 40 stores the identifier information of the wide area base station (not shown) of the wide area including the location of the reception apparatus 100C and the identifier information of the wide area base station 300 of the wide area including the location of the reception apparatus 100B, in the order mentioned, as the history of the identifier information.

Accordingly, even if incapable of receiving the identifier information of the wide area base station 300 of the wide area at the location of the reception apparatus 100A, the reception apparatus 100 can obtain the identifier information of the previous wide area base station 300 of the wide area in the history of the identifier information stored in the history memory unit included in the memory unit 40. At step S18, the control unit 10 prepares (selects) the identifier information of the previous wide area base station 300 of the wide area as the identifier information of the wide area base station of the wide area for association.

After step S18, since there is the identifier information of the wide area base station of the wide area for association, the memory information control unit 14 associates the identifier information of the wide area base station of the wide area with the service information of the narrow area base station 200 previously received (step S16). At step S16 also, the memory information control unit 14 controls to store the service information and the identifier information associated with each other as described above in the memory unit 40.

In contrast, if it is determined at step S17 not to use the identifier information of the previous wide area base station of the wide area, the processing shifts to step S19. This may be a case that the history of the identifier information of the wide area base station of the wide area is not stored in the history memory unit of the memory unit 40 due to some reasons such as a poor condition of radio waves or the like or user setting not to use the history of the identifier information of the wide area base station of the wide area.

The control unit 10 stores the service information of the narrow area base station 200 of the narrow area which has been received in the memory unit 40 (step S19). This processing intends, by storing the service information of the narrow area base station of the narrow area first received without associating it with the identifier information of the wide area base station, to associate them when the identifier information of the wide area base station of the wide area is obtained later. This associating processing carried out when the identifier information of the wide area base station is obtained later is referred to as "postposing association processing," for convenience sake.

Figure 4:
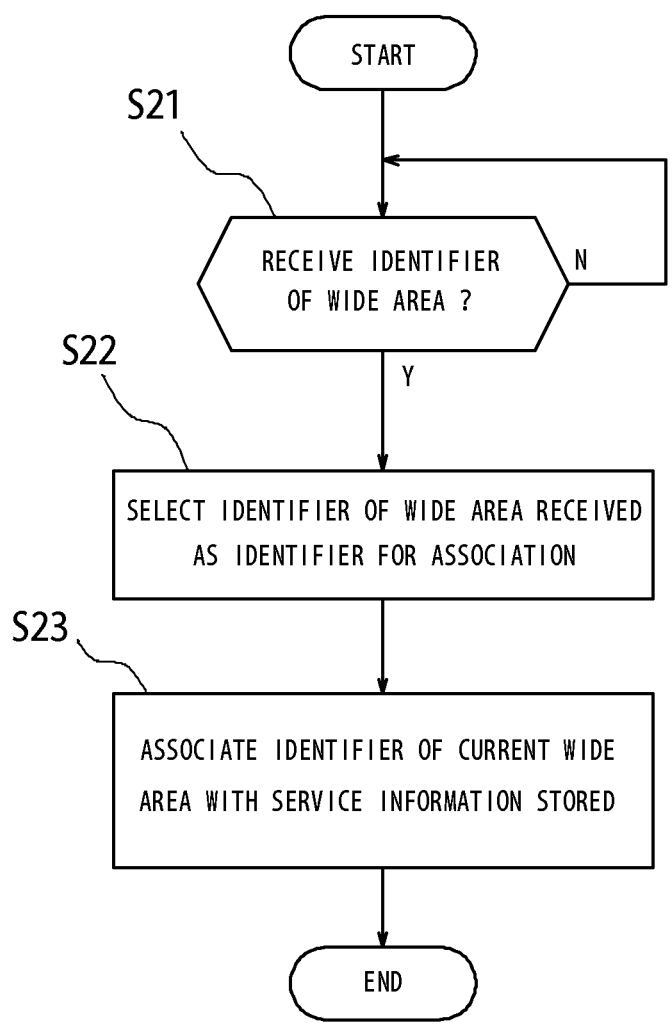
FIG. 4 is a flowchart illustrating postposing association processing of the service information according to the embodiment of the present invention.

Next, the postposing association processing of the service information by the reception apparatus 100 according to the present embodiment will be described. FIG. 4 is a flowchart illustrating the postposing association processing of the service information by the reception apparatus 100 according to the embodiment of the present invention. This processing is carried out after storing the service information of the narrow area base station first received without associating it with the identifier information of the wide area base station at step S19 because in the associating processing of the service information described with reference to FIG. 3 the identifier information of the wide area base station of the wide area could not be obtained. This processing, in the example shown in FIG. 1, corresponds to a case that the user at the location of the reception apparatus 100A, that is, in the narrow area cannot obtain the identifier information of the wide area base station 300 of the wide area. Even in this case, it is considered that the user leaves the narrow area to go home or for other purposes when he finishes shopping or the like in the narrow area (inside a building of a mass retailer). As described above, even if it fails to obtain the identifier information of the wide area base station of the wide area in the narrow area, the reception apparatus 100 may be able to obtain it once moves out from the narrow area.

As described above, at a point when the reception apparatus 100 becomes capable of obtaining the identifier information of the wide area base station of the wide area by moving out from the narrow area or the like, the postposing association processing of the service information starts. Upon start of this processing, the control unit 10 first determines whether the reception unit 30 has received identifier information of the wide area base station of the wide area (step S21).

When the reception apparatus 30 receives identifier information of the wide area base station of the wide area at step S21, the control unit 10 selects the identifier information of the wide area base station of the wide area as the identifier information of the wide area base station of the wide area for association (step S22). This processing is similar to that at step S18 described with reference FIG. 3. After step S22, the memory information control unit 14 associates the identifier information of the wide area base station of the wide area with the service information of the narrow area base station 200 of the narrow area previously received (step S23). This processing is similar to that at step S16 via step S18 described with reference FIG. 3.

The associating processing of the service information described with reference to FIG. 3 and the postposing association processing of the service information described with reference to FIG. 4 enable to associate the service information received from the narrow area base station 200 with the identifier information received from the wide area base station 300 in various cases.

Next, display processing of the service information by the reception apparatus 100 according to the embodiment of the present invention will be described. This processing is to display the service information of the narrow area base station of the narrow area, associated with the identifier information of the wide area base station of the wide area in the above processing, on the reception apparatus 100.

It is considered that there is hardly the necessity of the display processing of the service information at the moment or immediately after the service information of the narrow area base station of the narrow area is associated with the identifier information of the wide area base station of the wide area by the above processing. This is because, if the service information is instantaneous information, it is preferred that the reception apparatus 100 displays the service information on the display unit 50 immediately upon reception thereof as shown by the processing from step S12 to step S13 in FIG. 3.

Accordingly, the service information of the narrow area base station of the narrow area suitable for this processing may be information to be displayed in the future, such as a notice of an event or a sale held in the near future, schedules for arrival of products and the like in the shop of the narrow area to distribute the service information. As for the time to display such service information may suitably set by the reception apparatus 100 based on the display time condition included in the service information as described above. Suitable setting of the display time condition included in the service information enables to avoid a disadvantage such as displaying the service information of the shop when the user leaves the narrow area to go home or for other purposes after finishing shopping or the like.

It is assumed that this processing is carried out if the user of the reception apparatus 100, after the day when the service information of the narrow area base station is associated with the identifier information of the wide area base station by the processing shown in FIG. 3 (or FIG. 4), moves from the location of the reception apparatus 100C to the location of the reception apparatus 100B in FIG. 1 again. Particularly, it may be when, for example, the user enters the wide area of the wide area base station 300 near the shop defining the narrow area of the narrow area base station 200 after leaving the location of the reception apparatus 100C close to the user's home. That is, it may be when the user carrying the reception apparatus 100 is approaching again the shop whose service information was received by the reception apparatus 100 when the user visited the shop in the past.

Figure 5:
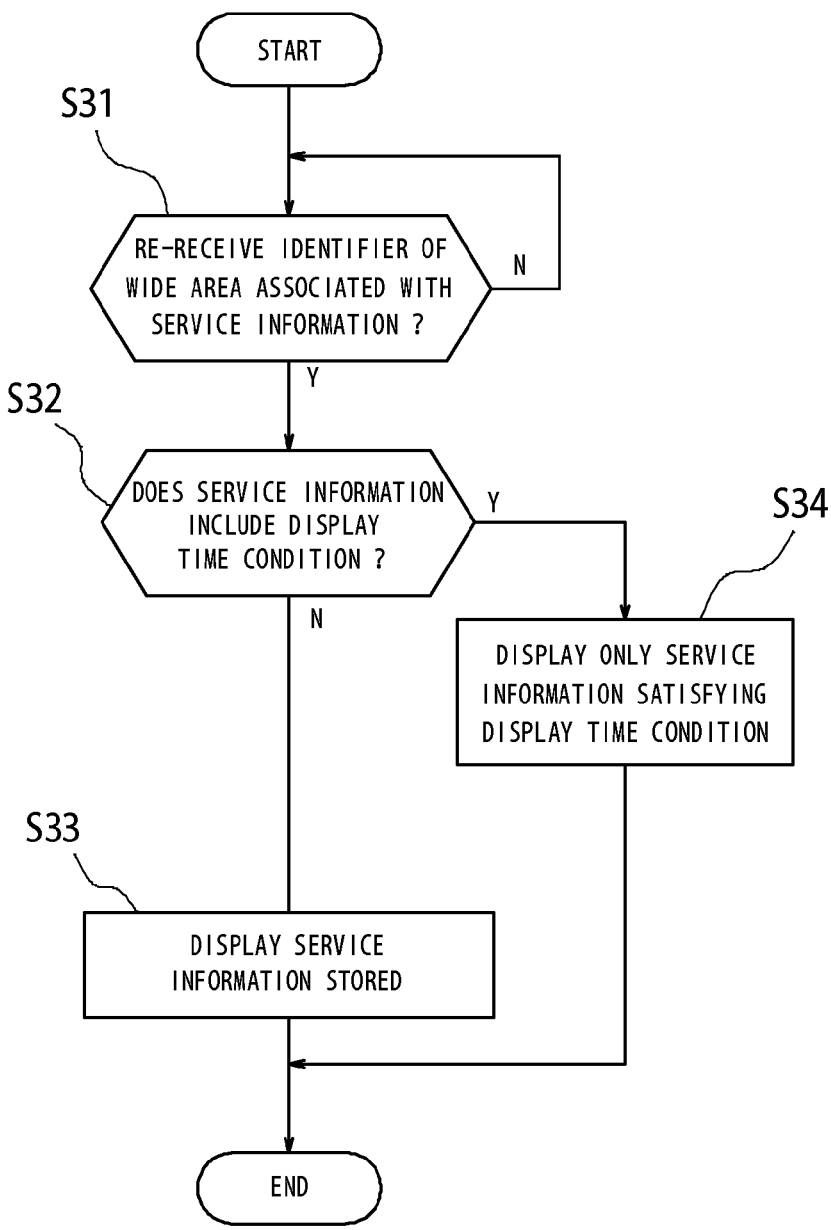
FIG. 5 is a flowchart illustrating processing to display the service information according to the embodiment of the present invention.

FIG. 5 is a flowchart illustrating the display processing of the service information by the reception apparatus 100 according to the embodiment of the present invention.

Upon start of this processing, the control unit 10 determines whether the reception unit 30 has re-received the identifier information of the wide area base station of the wide area associated with the service information stored in the memory unit 40 (step S31). Here, "re" indicates an assumption that the reception apparatus 100 had already received the identifier information of the wide area base station 300 of the wide area when the reception apparatus 100 carried out the associating processing of the service information of the narrow area base station 200.

As described above, if the reception apparatus 100 moves from the location of the reception apparatus 100C to the location of the reception apparatus 100B shown in FIG. 1, the reception apparatus 100 can receive the identifier information of the wide area base station 300 of the wide area. Here, the identifier information of the wide area base station 300 of the wide area is already stored in the memory unit 40, being associated with the service information of the narrow area base station 200 of the narrow area. Accordingly, by receiving the identifier information of the wide area base station 300 at the location of the reception apparatus 100B, the control unit 10 can recognize that it is the identifier information of the wide area base station 300 of the wide area associated with the service information of the narrow base station 200.

Upon reception of the identifier information of the wide area base station 300 of the wide area associated with the service information at step S31, the display control unit 12 determines whether the service information associated with the identifier information includes the display time condition (step S32). If the service information does not includes the display time condition at step S32, the display control unit 12 displays the service information associated with the identifier information stored in the memory unit 40 on the display unit 50 (step S33). As described above, if the service information does not include the display time condition, the display control unit 12, regarding that the service information can be displayed without a consideration of the display time, displays the service information on the display unit 50 upon reception the identifier information associated with the service information.

In contrast, if the service information includes the display time condition at step S32, the display control unit 12 displays service information satisfying the display time condition among the service information associated with the identifier information and stored in the memory unit 40 on the display unit 50 (step S34). In this case, the display control unit 12 analyzes the display time condition, and if it determines that the display time condition is currently satisfied, displays the service information on the display unit 50. If a part of the service information satisfies the display time condition, the display control unit 12 displays only the part satisfying the display time condition in the service information on the display unit 50. If the service information includes the display time condition, but no part satisfying the display time condition currently, the display control unit 12 does not display the service information on the display unit 50.

The following is a description of effects of the above processing according to the present invention. In FIG. 1, when the user of the reception apparatus 100 moves to the location of the reception apparatus 100A and enters the shop of the narrow area defined by the narrow area base station 200, the reception apparatus 100 can receive the service information of the shop distributed from the narrow area base station 200. Accordingly, the shop can provide the consumers with current shop information (products information and the like), thereby enhancing the consumers' purchasing interests in the products of the shop and the like.

In addition, the reception apparatus 100 can receive the service information of the shop distributed from the narrow area base station 200 intended to be displayed later. In this case, the reception apparatus 100, using any methods described above, associates the identifier information of the wide area base station 300 of the wide area with the service information of the narrow area base station 200 of the narrow area and stores them in the memory unit 40. Thereby, information of the day or the next day among information (distributed by the narrow area base station 200) of a shop nearby, for example, is displayed on the reception apparatus 100 when the user of the reception apparatus 100 comes to the location of the reception apparatus 100B (wide area defined by the wide area base station 300) at a later date.

Accordingly, the service information distributed by the narrow area base station 200 of the narrow area is provided at a suitable time when the reception apparatus 100 enters the wide area surrounding the narrow area. Since the service information is provided to the consumers in an appropriate area on a suitable time, the service information can be expected to have consumer attraction.

Although the location of the reception apparatus 100 is specified based on an area according to the present invention, the location of the reception apparatus is determined based on the identifier information from the wide area base station and thus does not need an advanced location system, such as GPS. In addition, there is no need to prestore voluminous information, such as map information, for locating the reception apparatus 100, either. According to the present invention, therefore, it is possible to display suitable service information according to the location by locating the terminal itself without a heavy load on the terminal or a large memory capacity of the terminal and an advanced function unit. Moreover, since only data necessary for a communication between the reception apparatus 100 and the wide area base station trigger to display the service information, processing load to display the service information is very light.

According to the present invention, additionally, since the reception apparatus 100 receives the service information for each area distributed from the narrow area base station of each narrow area, it does not need to store in advance the service information in the reception apparatus 100. Moreover, the service information is displayed on only the reception apparatus 100 to which the service information is already distributed, around or near the area in which the service information is distributed according to the present invention. According to the present invention, therefore, it is possible to guide the user of the reception apparatus 100, to which the service information is distributed, not to another area having a similar service but to the narrow area in which the service information is distributed.

The following is an example of information which may be used as the service information according to the present invention. In the above embodiment, the information on the event such as the sale held in the near future and the information on the schedules for arrival of the products are used as suitable examples of the service information. It is considered that, in an industry capturing the trend such as clothing, for example, especially the information on schedules for arrival of products attracts the consumers.

Another example of the service information may be coupons of restaurants, for example. Such coupons are displayed in a limited period based on the display time condition and can be reusable unlimitedly within the period. It offers much more consumer attraction by providing (displaying) these coupons in combination with advertisement of a new menu being started, for example.

Such coupon service may be applicable not only to the restaurants but to other shops dealing with different products to allow the user to use them not this time but on next visit. Thereby, it is expected to increase frequency for the consumers to visit the shops.

In addition, it is considered to be effective to distribute service information introducing products, such as new CDs and DVDs. Since the service information described above is electronic data substantially, it may be constituted of not only texts and images but also sound and video files. Therefore, it may be effective to provide the service information allowing a user to play sample music in the new CDs or sample videos of the new DVDs. Similarly, there may be service information introducing new movies shown at a theater. In this case, it is effective to include trailers (sample videos) and benefits in the service information.

As for products such as CDs, DVDs and books, movies shown at theaters and the like, different shops provides the same products and service, and therefore, it may be difficult for the shops and the theaters to appeal their features. Even in such a case, it is expected that the service information different from other shops has an effect to attract the consumer again to the shop (no other shops) which provides the service information the first.

Next, a condition which may be used as the display time condition according to the present invention will be described. For example, it is possible to change display of the service information according to time, even if distributed from one shop, by adding the display time condition for each of contents. It is possible, for example, to display the service information on an item "Release from Tomorrow" when the reception apparatus enters an area surrounding the shop and to change the display to "Now on Sale!" when it enters the same area the next day. As described above, by setting the display time condition to change the display according to the time, it is possible to offer information in an even more timely fashion to the consumers.

In addition, although the display time condition is related mainly to a time in the above embodiment, various conditions can be considered. For example, it is also possible that by storing in advance personal information, such as the gender, an age, an address, an occupation, personal interests and the like of the user in the memory unit 40 or asking the user to input such information, the reception apparatus 100 compares it to the display time condition. That is, if the personal information matches the display time condition included in the service information transmitted from the narrow area base station, the reception apparatus 100 can display the service information. Thereby, it is possible to display the service information matching the user's interests, so that the service information is expected to have even more consumer attraction.

It is to be understood that the present invention is not limited to the embodiment set forth above but may be modified or varied in a multiple manner. For example, in the above embodiment, upon reception of the service information from the narrow area base station 200 of the narrow area, the reception apparatus 100 determines whether to be able to receive the identifier information of the wide area base station 300 of the wide area. However, the reception apparatus 100 may not receive the identifier information of the wide area base station 300 of the wide area immediately after receiving the service information. That is, the reception apparatus 100 may receive the identifier information of the wide area base station 300 of the wide area when the display time condition included in the service information received from the narrow area base station 200 of the narrow area is satisfied. In this case, if the reception apparatus 100 can receive the identifier information which should be associated with the service information, it displays the service information while carrying out the associating processing simultaneously.

In addition, there may be a case that the reception apparatus 100 can receive a plurality of different identifier information from a plurality of wide area base stations at step S15, for example, in the associating processing of the service information described with reference to FIG. 3. In this case, the reception apparatus 100 may store all of or a predetermined number of the plurality of different identifier information from the plurality of the wide area base stations in the memory unit 40. If the plurality of different identifier information is stored as above, it is possible to determine, according to a predetermined priority, which or how many pieces of identifier information are associated with the service information. In this case, the priority may be determined based on an electric field intensity of radio waves when receiving the radio waves from the wide area base station which has transmitted each of the identifier information, the size of a cell covered by each wide area base station, or the like.

REFERENCE SIGNS LIST 10 control unit
12 display control unit
14 memory information control unit
20 antenna 30 reception unit
40 memory unit
50 display unit
60 operation input unit
100 reception apparatus
200 narrow area base station
300 wide area base station

The invention claimed is:

1. A reception apparatus comprising:
   a reception unit configured to receive service information including a display time condition and transmitted from a narrow area base station and identifier information of a wide area base station transmitted from the wide area base station;
   a memory unit configured to store the service information and the identifier information received by the reception unit;
   a display unit configured to display the service information; and
   a control unit, after storing the service information received by the reception unit and the identifier information of the wide area base station received by the reception unit in association with each other in the memory unit, configured to control the display unit to display service information satisfying the display time condition among the service information stored in the memory unit when the reception unit re-receives the identifier information of the wide area base station associated with the service information.

2. The reception apparatus according to claim 1, wherein the control unit, when the reception unit receives the service information, stores the service information in the memory unit in association with the identifier information of the wide area base station received by the reception unit.

3. The reception apparatus according to claim 1, wherein the control unit, if the reception unit cannot receive the identifier information of the wide area base station when receiving the service information, stores the service information in the memory unit, and when the reception unit receives the identifier information later, stores the identifier information in association with the service information stored in the memory unit.

4. The reception apparatus according to claim 1, further comprising a history memory unit configured to store a history of identifier information of wide area base stations received by the reception unit, wherein
   if the reception unit cannot receive the identifier information of the wide area base station when receiving the service information, the control unit stores the service information in the memory unit in association with identifier information selected from the history of the identifier information of the wide area base stations stored in the history memory unit.

5. A communication system comprising:
   a narrow area base station configured to transmit service information including a display time condition to a reception apparatus;
   a wide area base station configured to transmit its own identifier information to the reception apparatus; and
   the reception apparatus, after storing the service information transmitted from the narrow area base station and the identifier information transmitted from the wide area base station in association with each other, configured to display service information satisfying the display time condition among the service information stored when re-receiving the identifier information of the wide area base station associated with the service information.

* * * * *